(12) United States Patent
Campagnolo

(10) Patent No.: US 6,619,154 B2
(45) Date of Patent: Sep. 16, 2003

(54) ELECTRICAL CONTROL DEVICE FOR A MOTOR-DRIVEN DERAILLEUR FOR BICYCLES

(75) Inventor: Valentino Campagnolo, Vicenza (IT)

(73) Assignee: Campagnolo Srl., Vicenza (IT)

( * ) Notice: Subject to any disclaimer, the term of this patent is extended or adjusted under 35 U.S.C. 154(b) by 0 days.

(21) Appl. No.: 09/873,377

(22) Filed: Jun. 5, 2001

(65) Prior Publication Data

US 2001/0053724 A1 Dec. 20, 2001

(30) Foreign Application Priority Data

Jun. 6, 2000 (IT) .................... TO2000A0540

(51) Int. Cl.$^7$ ................ B62M 25/04; B62K 11/14; B62K 23/06
(52) U.S. Cl. ...................... 74/502.2; 74/489
(58) Field of Search ............... 74/473.14, 473.13, 74/502.2, 489, 501.6; 474/17, 78, 81, 82, 79, 80; 200/185, 11 R, 52 R, 61.12, 61.27, 409, 61.85, 61.87, 335

(56) References Cited

U.S. PATENT DOCUMENTS

| | | | |
|---|---|---|---|
| 4,490,127 A | * | 12/1984 | Matsumoto et al. ........ 474/110 |
| 4,605,240 A | * | 8/1986 | Clem et al. ................ 474/80 |
| 5,213,548 A | * | 5/1993 | Colbert et al. ............. 474/81 |
| 5,479,776 A | * | 1/1996 | Romano .................. 74/473.13 |
| 5,519,378 A | * | 5/1996 | Queensbury ............. 200/61.27 |
| 5,625,336 A | * | 4/1997 | Yamamoto ............. 340/309.15 |
| 5,670,988 A | * | 9/1997 | Tickle ................... 345/157 |
| 5,676,021 A | * | 10/1997 | Campagnolo ............. 74/489 |
| 5,806,372 A | * | 9/1998 | Campagnolo ............. 74/473.14 |
| 5,865,454 A | * | 2/1999 | Campagnolo ............. 474/78 |
| 5,900,705 A | * | 5/1999 | Kimura ................... 318/2 |
| 6,015,036 A | * | 1/2000 | Fukuda .................. 192/217 |
| 6,031,190 A | * | 2/2000 | Tokuda et al. ........... 200/11 R |
| 6,069,788 A | * | 5/2000 | Masui ................... 324/160 |
| 6,073,730 A | * | 6/2000 | Abe ..................... 74/489 |
| 6,142,281 A | * | 11/2000 | Campagnolo ............. 74/473.14 |
| 6,521,851 B2 | * | 2/2003 | Handa et al. ............ 200/61.87 |

FOREIGN PATENT DOCUMENTS

DE 3136922 A1 * 3/1983 ........... B62K/23/06

* cited by examiner

Primary Examiner—David A. Bucci
Assistant Examiner—Bradley J. Van Pelt
(74) Attorney, Agent, or Firm—Volpe and Koenig, P.C.

(57) ABSTRACT

An electrical control device for a motor-driven derailleur for bicycles. The control device has a supporting body adapted for attachment to the handlebars of a bicycle; a brake lever is mounted on the supporting body so that it can oscillate. A pair of electrical switches, for controlling gear change, are carried by the supporting body on a supporting plate which is mounted on the supporting body. Preferable the switches are pre-assembled on supporting plate before it is mounted on the supporting body.

17 Claims, 4 Drawing Sheets

ELECTRICAL CONTROL DEVICE FOR A MOTOR-DRIVEN DERAILLEUR FOR BICYCLES

BACKGROUND OF THE INVENTION

The present invention relates to an electrical control device for a motor-driven derailleur for bicycles.

More precisely, the invention relates to a control device of the type comprising:

- a supporting body provided with means for fixing it to the handlebars of a bicycle;
- a brake lever mounted on the supporting body in such a way that it can oscillate about a first axis;
- a pair of electrical switches for controlling gear change, which are carried by the supporting body; and
- a gear lever which can be operated manually for controlling one of said switches.

A control device of the type specified above is known from the U.S. Pat. No. 5,470,277 in the name of the present applicant, which describes an electrical control device provided with two switches set in a supporting body fixed to the handlebars of a bicycle. One first switch is operated by a gear lever set immediately behind the brake lever, and a second switch is operated by means of a push-button located on a side wall of the supporting body. The two electrical switches make it possible to actuate an electric motor associated to a derailleur for bicycles in two opposite directions. Actuation of the motor of the derailleur in one first direction makes it possible to obtain shifting of the chain in one first direction, for example towards the higher gear ratios, whilst actuation of the motor in the opposite direction corresponds to shifting of the chain in the opposite direction, for example towards the lower gear ratios.

The document U.S. Pat. No. 6,015,036 describes an electrical control device for a bicycle including a switch for controlling gear change, which is supported by the brake lever. A second switch for controlling gear change may be set in the vicinity of the brake lever. This solution is not as advantageous as the one in which both of the switches are set on the supporting body in so far as it entails the need to bring an electrical connection onto the brake lever, which oscillates with respect to the supporting body.

SUMMARY OF THE INVENTION

The purpose of the present invention is to provide a an electrical control device of an improved type which is simple from the constructional standpoint and has greater functionality than known devices.

According to the present invention the above purpose is achieved by a control device having the characteristics specified in claim 1.

BRIEF DESCRIPTION OF THE DRAWINGS

The present invention will now be described in detail with reference to the attached drawings, which are furnished purely by way of non-limiting example, and in which.

DETAILED DESCRIPTION OF THE DRAWINGS

Figure 1:
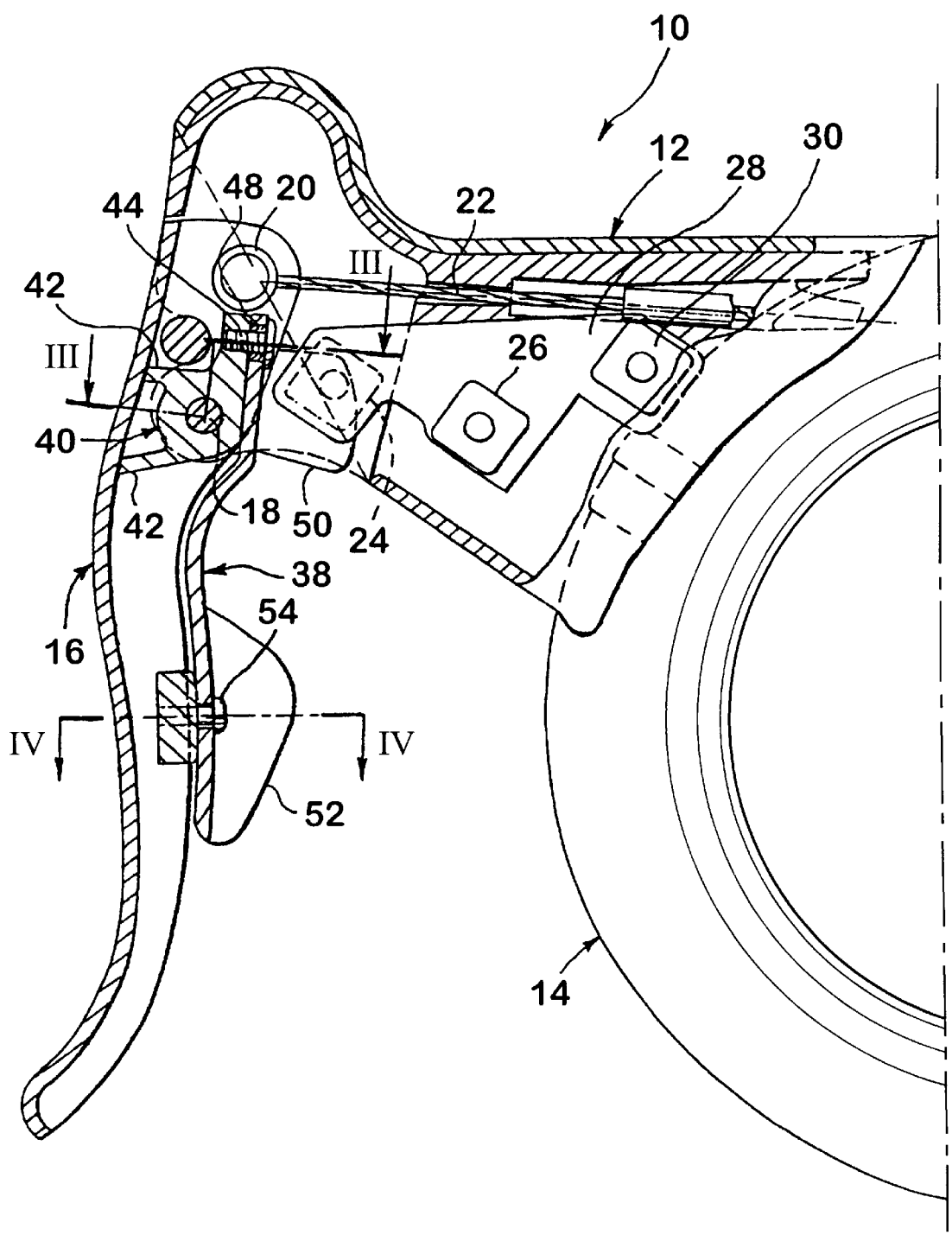
FIGS. 1 and 2 are side sectional views of a control device according to the present invention in two operating positions.

With reference to the drawings, the number 10 designates an electrical control device for a motor-driven derailleur for bicycles. The control device according to the present invention can be used for controlling a motor-driven gear change, for example of the type described in the U.S. Pat. No. 5,470,277 in the name of the present applicant.

The control device 10 comprises a supporting body 12 provided with means of a conventional type for its fixing to a bicycle handlebars 14. The control device 10 comprises a brake lever 16 which is articulated to the supporting body 12 by means of a pivot 18. One end 20 of a brake cable 22 is anchored in a conventional way to a top portion of the brake lever 16. As may be seen in FIGS. 1 and 2, the brake lever 16 may be made to oscillate manually about the pivot 18 for controlling the bicycle brake, in an altogether conventional way.

The supporting body 12 carries a pair of electrical switches, designated by 24 and 26, for controlling gear change. Preferably the said switches are set on opposite faces of a supporting plate 28 fixed to the supporting body 12. In the example of embodiment illustrated in the figures, the supporting plate 28 also carriers a third switch 30 designed to control a cycle-computer (not illustrated). The first switch 24 is designated to operate an electrical motor for controlling a gear change (not illustrated) in one first direction corresponding, for example, to shifting of the chain towards higher gear ratios. Operation of the second switch 26 causes actuation of the motor in the opposite direction, corresponding, for example, to shifting of the chain towards lower gear ratios. The control device 10 can be used indifferently for controlling the front derailleur or the rear derailleur of a bicycle. Consequently, in the control device set on the right-hand side of the bicycle handlebars (usually designed to control the rear derailleur), the switch 24 controls gear change towards lower gear ratios (i.e., shifting of the chain onto gear wheels with a greater number of teeth), whilst the switch 26 controls gear change towards higher gear ratios (i.e., shifting of the chain onto gear wheels with a smaller number of teeth). Instead, in control device set on the left-hand side of the handlebars (usually designed to control the front derailleur), the situation is reversed; i.e., the switch 24 controls gear change towards higher gear ratios (i.e., towards a gear wheel driven by the bottom bracket with a greater number of teeth), whilst the switch 26 controls gear change towards lower gear ratios (i.e., towards a gear wheel driven by the bottom bracket with a smaller number of teeth).

Figure 3:
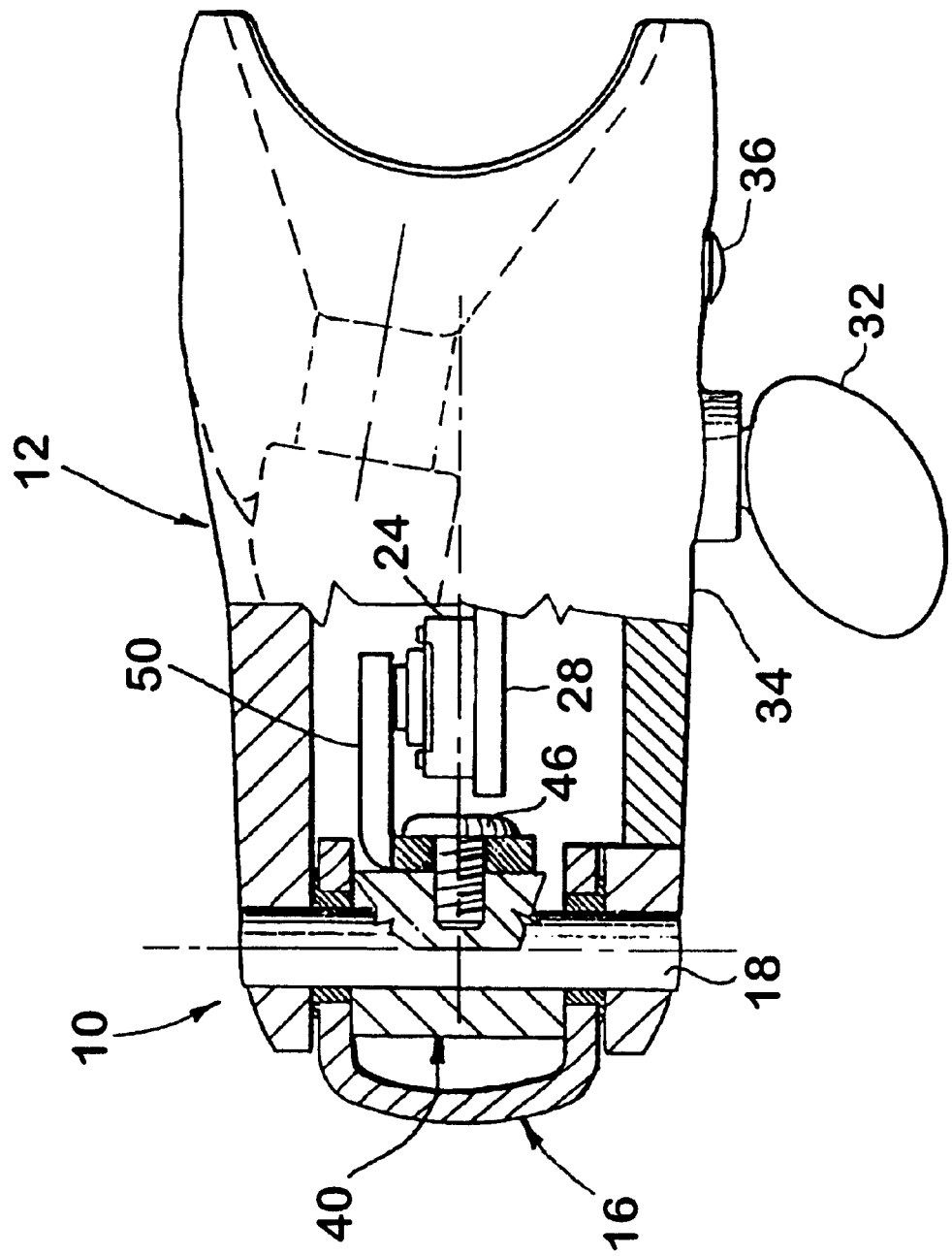
FIG. 3 is a cross section according to the line III—III of FIG. 1.

With reference to FIG. 3, the switch 26 is preferably controlled by means of a push-button 32 set on one side of the supporting body 12, in a position such that it can be operated by the cyclist's thumb while the cyclist's hand engages the supporting body 12 or the curved part of the handlebars 14. Preferably, the push-button 32 has a control surface which is substantially orthogonal to a side wall 34 of the supporting body 12 and is articulated to said side wall 34 about an axis that is substantially orthogonal to the pivot 18.

Preferably, the switch 30 designed for operative control of the cycle-computer can be acutted by means of a push-button 36 that slightly projects from the side wall 34 of the supporting body 12 and is provided with a short operating travel in a direction substantially orthogonal to the side wall 34.

Figure 2:
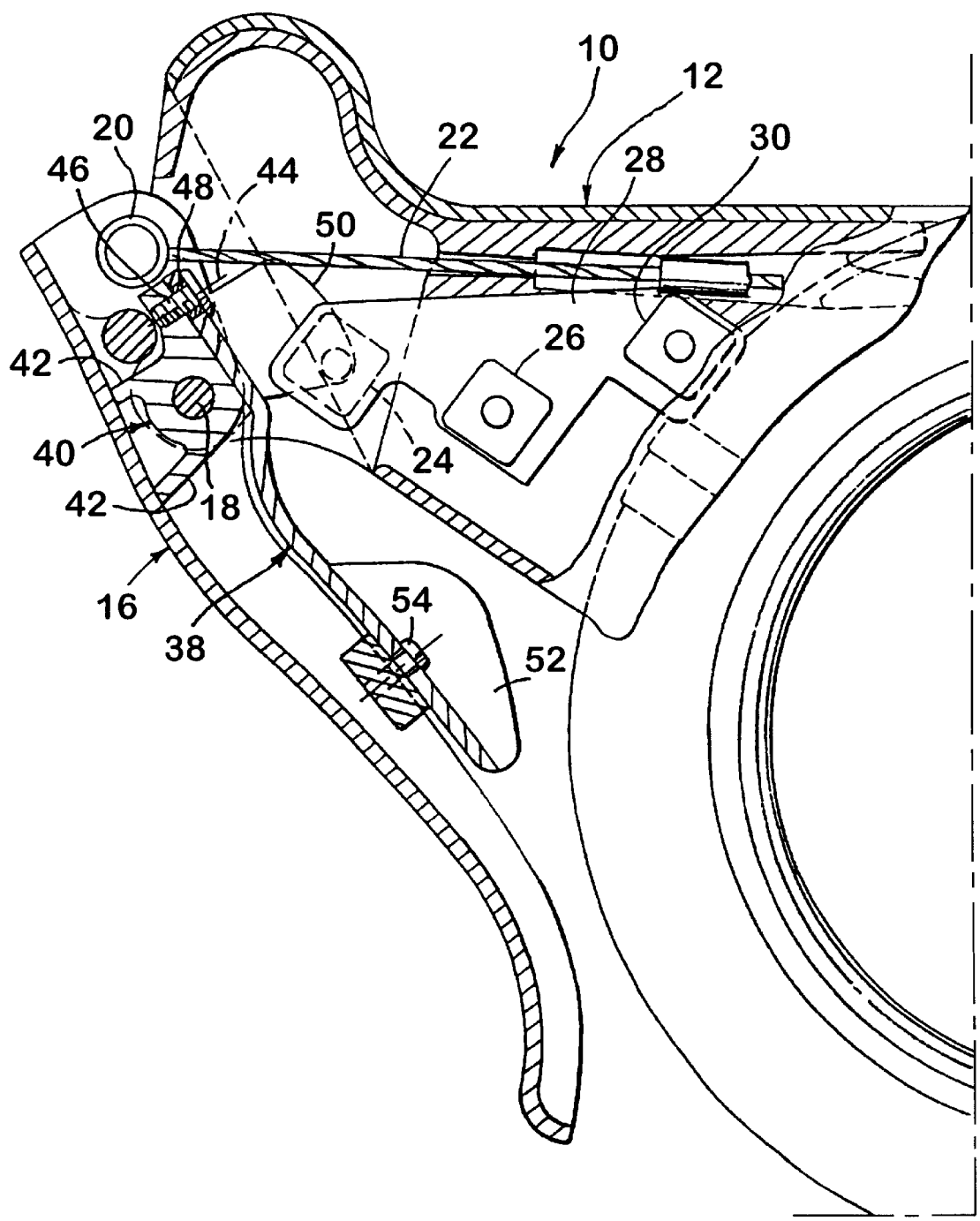

The control device according to the present invention comprises a gear lever 38 set immediately behind the brake lever 16. The control lever 38 is carried, so that it can oscillate, by an intermediate support 40, which in turn is mounted on the supporting body 12 in such a way that it oscillates about the axis of the pivot 18 of the brake lever 16. As may be seen in FIG. 3, the brake lever 16 has a substantially U-shaped cross section, and the intermediate support 40 is preferably housed inside the brake lever. The intermediate support 40 is free to rotate about the pivot 18. As illustrated in FIGS. 1 and 2, the intermediate support 40 rests against the internal surface of the brake lever 16 by means of a pair of projecting portions 42. Consequently, when the brake lever 16 is made to oscillate from the resting position, illustrated in FIG. 1, to a braking position, illustrated in FIG. 2, the intermediate support 40 oscillates together with the brake lever 16 about the pivot 18. The control lever 38 is articulated to the intermediate support 40 about an axis 44 which is substantially orthogonal to the axis of the pivot 18 of the brake lever. In the example illustrated in the figures, the articulated connection between the gear lever 38 and the intermediate support 40 is obtained by means of a screw 46 fixed to the intermediate support 40 and carrying a bushing 48 about which the lever 38 turns. The said lever 38 is therefore free to oscillate about the axis 44, and moreover oscillates about the axis of the pivot 18 together with the brake lever 16 during the braking movement, as illustrated in FIG. 2.

The gear lever 38 is provided with two flaps or tabs 50, 52 (which in the example illustrated are integral with the lever) constituting, respectively, a portion for actuating the switch 24 and a control portion on which it is possible to act manually for causing the lever 38 to oscillate about the axis 44 in the direction corresponding to the actuation of the switch 24.

Figure 4:
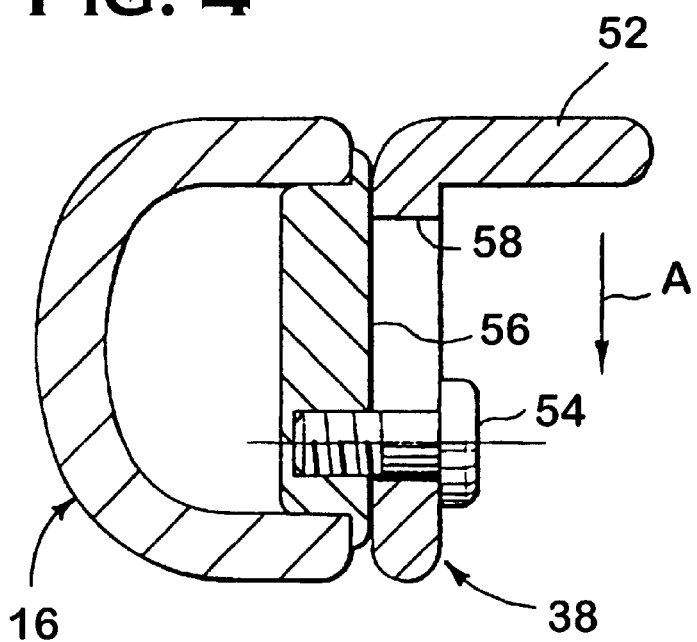
FIGS. 4 and 5 are cross sections according to the line IV—IV of FIG. 1 in two operating positions.
Figure 5:
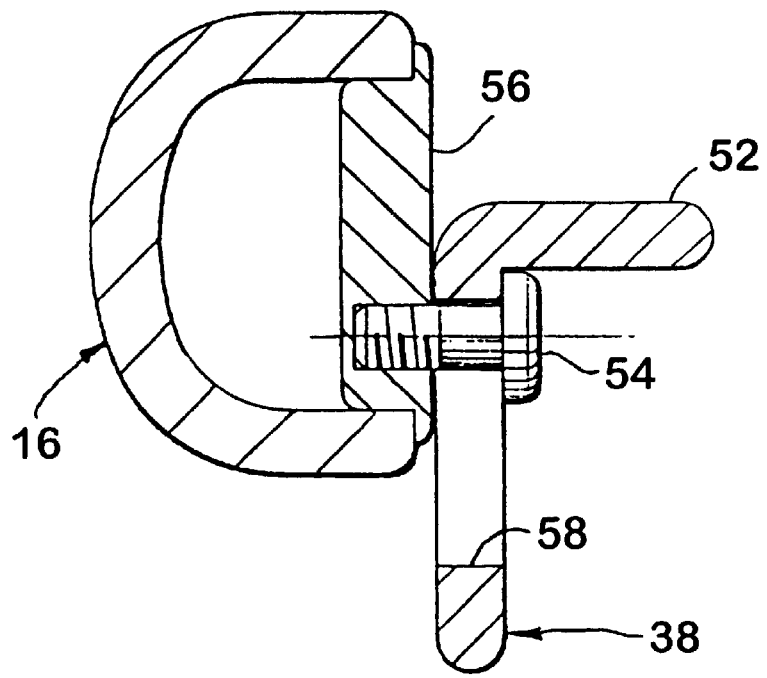

Preferably, the gear lever 38 is associated to an arrest device which limits the range of oscillation of the lever 38, in order to prevent damage to the switch 24. As is illustrated in greater detail in FIGS. 4 and 5, the said arrest device comprises a pin 54 fixed to a plate 56, which in turn is fixed to the brake lever 16, on the surface of the latter that faces the handlebars 14. The pin 54 engages with play a groove 58 made in the gear lever 38. FIG. 4 illustrates the gear lever in the resting position, in which the tab 50 constituting the portion for actuating the switch 24 is set facing, and at a slight distance from, the switch 24. To issue a command for gear change, the user acts manually on the tab 52, causing the control lever 38 to oscillate in the direction indicated by the arrow A in FIG. 4. FIG. 5 illustrates the position of maximum oscillation of the lever 38, defined by the impinging of the pin 54 upon the end of the groove 58. In this position, the tab 50 actuates the switch 24, which controls gear change. As illustrated in FIG. 2, the tab 50 of the gear lever 38 which operates the switch 24 can have an extension whereby it is facing the switch 24 even when the brake lever 16 is in the braking position. In this way, the cyclist has the possibility of changing gears even while he is applying the brakes. Gear change in the opposite direction is by exerting pressure on the push-button 32 in a direction orthogonal to the plane of representation of FIG. 3, so as to cause said push-button to oscillate in a direction to which there corresponds operation of the switch 26.

In particular, according to a further aspect of the invention, the lever 38 could be eliminated, and the switch 24 could have its push-button set in such a way that it can be operated directly. In this case, the invention would present even so its innovative characteristic consisting in the fact that the electrical switches are all carried by the supporting plate 28, so that they can be pre-assembled on the plate and then be simultaneously arranged in their final positions by simply mounting the plate on the body 12 for supporting the brake lever.

I claim:

1. A control device located on a handlebar of a bicycle and adapted to actuate at least one switch operatively associated with an electric device on the bicycle, comprising:

a supporting body adapted to be disposed on the handlebar;

a brake lever pivotably mounted on the supporting body about a pivot axis;

an intermediate support, pivotably mounted on the supporting body proximate to the pivot axis, that rotates about the pivot axis upon rotation of the brake lever about the;

a control lever, for operating the at least one switch, pivotably mounted to the intermediate support about a second pivot axis that is substantially orthogonal to the pivot axis such that the control lever is movable in a direction substantially orthogonal to a motion path of the brake lever;

stops attached to the brake lever that limit the intermediate support's rotation about the pivot axis within a range of travel; and second stops, including a pin and slot connection between the brake lever and the control lever, that limit the control lever's rotation about the second pivot axis within a range of travel.

2. A control device according to claim 1, wherein the control lever is located generally between the brake lever and the handlebar when the supporting body is located on the handlebar.

3. A control device according to claim 1, wherein the brake lever comprises an elongated body with a substantially U-shaped cross section defining a rearward facing cavity, the cavity containing the intermediate support.

4. A control device according to claim 3, wherein the intermediate support further comprises at least one projecting portion engaged with the brake lever such that rotation of the brake lever about the pivot axis results in rotation of the intermediate support about the pivot axis.

5. A control device according to claim 4, wherein the brake lever extends in a first direction from the pivot axis and supporting body, and the intermediate support extends in a second direction generally opposite from the first direction relative to the pivot axis.

6. A control device according to claim 1, wherein the control lever comprises a manual activation control surface.

7. A control device according to claim 6, wherein the control lever further comprises a switch activation control surface.

8. A control unit located on a handlebar of a bicycle and operatively associated with at least one electric device on the bicycle, comprising:

a supporting body adapted to be disposed on the handlebar;

a brake lever pivotably mounted on the supporting body about a pivot axis;

an intermediate support, pivotably mounted on the supporting body proximate to the pivot axis, that rotates about the pivot axis upon rotation of the brake lever about the pivot axis;

a control lever, for operating at least one switch, pivotably mounted to the intermediate support about a second pivot axis that is substantially orthogonal to the pivot axis such that the control lever is movable in a direction substantially orthogonal to a motion path of the brake lever;

a first electric switch, mounted on the supporting body for actuation by the control lever;

stops attached to the brake lever that limit the intermediate support's rotation about the pivot axis within a range of travel; and a second electric switch located on an opposite face of the supporting body.

9. A control unit according to claim 8, wherein the control lever is located generally between the brake lever and the handlebar when the supporting body is located on the handlebar.

10. A control unit according to claim 8, wherein the brake lever comprises an elongated body with a substantially U-shaped cross section defining a rearward facing cavity, the cavity containing the intermediate support.

11. A control unit according to 10, wherein the intermediate support further comprises at least one projecting portion engaged with the brake lever such that rotation of the brake lever about the pivot axis results in rotation of the intermediate support about the pivot axis.

12. A control unit according to claim 11, wherein the brake lever extends in a first direction from the pivot axis and supporting body, and the intermediate support extends in a second direction generally opposite from the first direction relative to the pivot axis.

13. A control unit according to claim 8, wherein the control lever comprises a manual activation control surface and a switch activation control surface positioned for operation of the first electric switch along an entire motion path about the pivot axis.

14. A control unit according to claim 8, wherein the brake lever comprises second stops, that limit the control lever's rotation about the second pivot axis within a range of travel.

15. A control unit according to claim 8, wherein the second electric switch comprises a second manual control surface substantially orthogonal to the opposite face.

16. A control unit according to claim 15, wherein the first electric switch and second electric switch control upshifting and downshifting of the bicycle.

17. A control unit located on a handlebar of a bicycle and operatively associated with at least one electric device on the bicycle, comprising:

a supporting body adapted to be disposed on the handlebar;

a brake lever pivotably mounted on the supporting body about a pivot axis;

an intermediate support, pivotably mounted on the supporting body proximate to the pivot axis, that rotates about the pivot axis upon rotation of the brake lever about the pivot axis;

a control lever, for operating at least one switch, pivotably mounted to the intermediate support about a second pivot axis that is substantially orthogonal to the pivot axis such that the control lever is movable in a direction substantially orthogonal to a motion path of the brake lever;

a first electric switch, mounted on the supporting body for actuation by the control lever;

stops attached to the brake lever that limit the intermediate support's rotation about the pivot axis within a range of travel; and second stops including a pin and slot connection between the brake lever and the control lever, that limit the control lever's rotation about the second pivot axis within a range of travel.

* * * * *

UNITED STATES PATENT AND TRADEMARK OFFICE
CERTIFICATE OF CORRECTION

PATENT NO.    : 6,619,154 B2
DATED         : September 16, 2003
INVENTOR(S)   : Valentino Campagnolo It is certified that error appears in the above-identified patent and that said Letters Patent is hereby corrected as shown below:

<u>Column 4,</u>
Line 14, after the phrase "about the", insert -- pivot axis --.

<u>Column 5,</u>
Line 32, after the word "stops", delete ",".

<u>Column 6,</u>
Line 29, after the word "stops", insert -- , --.

Signed and Sealed this

Sixth Day of April, 2004

JON W. DUDAS
*Acting Director of the United States Patent and Trademark Office*